June 3, 1952     C. E. GIOVANNONI     2,598,682
SKI ATTACHMENT FOR WHEELED VEHICLES
Filed Sept. 9, 1949
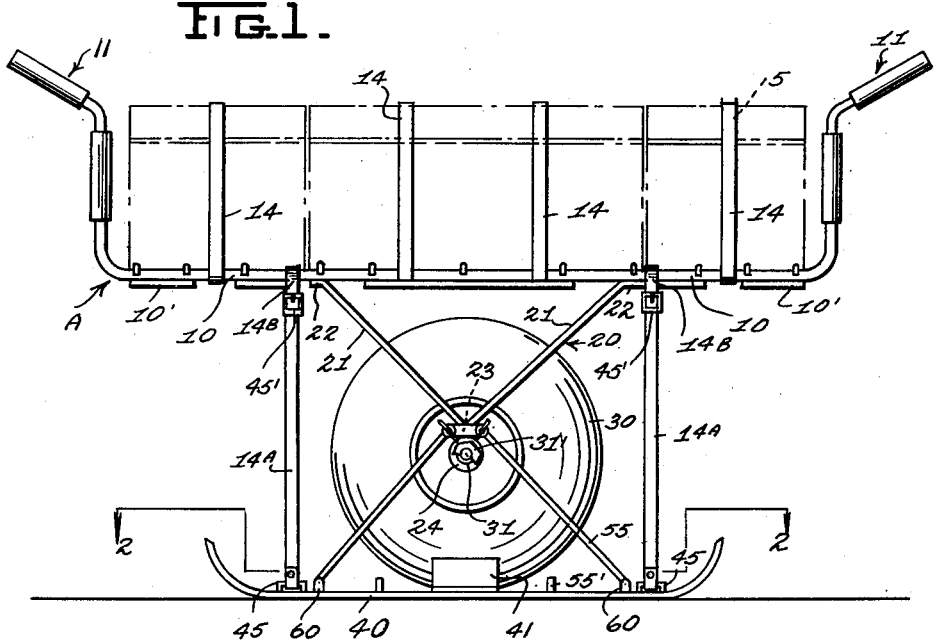
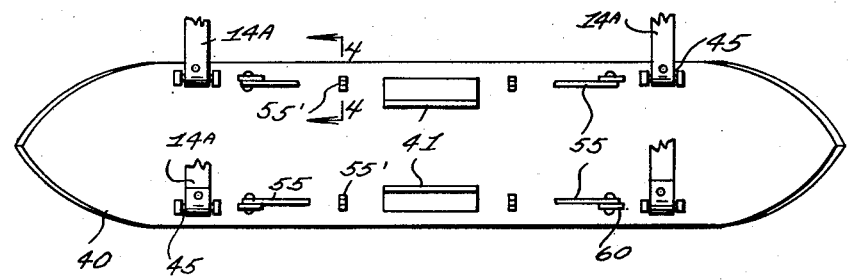
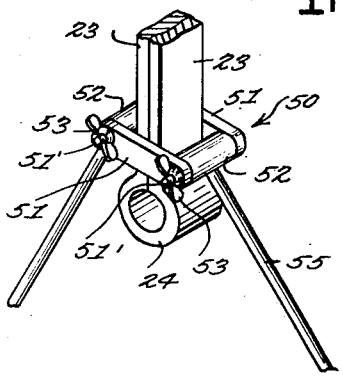
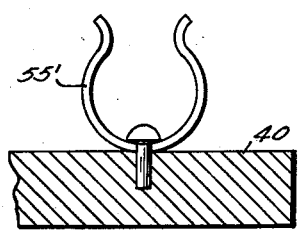
INVENTOR.
CASH E. GIOVANNONI
BY
McMorrow, Berman & Davidson
ATTORNEYS Patented June 3, 1952

2,598,682

UNITED STATES PATENT OFFICE 2,598,682

SKI ATTACHMENT FOR WHEELED VEHICLES

Cash E. Giovannoni, Boulder City, Nev.

Application September 9, 1949, Serial No. 114,859

3 Claims. (Cl. 280—14)

This invention relates to new and useful improvements in ski attachments for wheeled vehicles, and more particularly and specifically to a ski attachment for a mobile pack carrier of the type including a frame and a mono-wheel support.

The primary object of this invention resides in the provision of a ski-support attachment to be quickly and easily applied to a wheeled pack carrier to convert the pack carrier for convenient use in snow, mud and the like, and for use under similar conditions where it is impractical to wheel the carrier.

Another prime object of the invention lies in the provision of a ski attachment for a vehicle which can be easily transported with the vehicle and which is readily adaptable to quick and easy application when the use thereof becomes desirable.

A still further and salient feature of the invention is the provision of a ski attachment of the character set forth which is of extremely simple, durable and inexpensive design and construction.

Still further improvements and advantages of the present invention will become readily apparent to those skilled in the art when the following description is read in the light of the accompanying drawings, in which:

Figure 1 is a side elevation of a ski attachment as applied to a mono-wheel pack carrier;

Figure 2 is a top plan view of the ski member as viewed along line 2—2 of Figure 1;

Figure 3 is a fragmentary perspective view of the top clamp means employed in securing the ski attachment to the wheeled pack carrier;

Figure 4 is an enlarged cross-sectional detail view taken on line 4—4 of Figure 2.

Referring now with particularity to the accompanying drawings in which like characters indicate similar parts throughout the several views, A designates the frame of a mobile pack carrier including longitudinal frame bars 10 with handles 11 at each end thereof. The frame bars 10 are connected by suitable transverse members 10'. Located along the frame in longitudinally-spaced relationship are a plurality of belt straps 14 having attachment with the frame. The straps connected to one frame bar 10 are provided with buckles, whereby the straps connected to the other frame bar may be fastened to the first straps for securing packs 5 to the frame.

Depending from and secured to each frame bar 10 is a support brace 20 including a pair of arms 21 secured to the frame bars in widely-spaced relationship, as at 22. These arms converge downwardly and inwardly from the frame to converge and extend vertically downwardly for a short distance, as shown at 23, 23 in parallel adjacency. Below the parallel portions 23, these arms form a circular boss 24. The entire support brace structure secured to each frame bar 10 is formed of a single piece.

A wheel 30 rotatably mounted on an axle provided with extended bearing portions 31 is disposed centrally beneath the frame and between the support braces 20. The respective extended bearing portions 31, 31 of the axle of wheel 30 are mounted in the circular hub bosses 24 of the support braces 20. A hexagonal nut 31', shown partly broken away in Figure 1, is threaded on each end of the axle and engages the hub boss 24 thereat, rigidly securing the hub boss in position.

The ski attachment includes a single doubleended ski 40 having transversely-spaced and longitudinally-extending ears 41 turned upwardly therefrom. Ears 41 are located at the intermediate portions of the ski. These ears receive the wheel 30 snugly therebetween when the ski is placed beneath the carrier.

At each end of the ski there are provided transversely-spaced pairs of inverted, U-shaped, longitudinal braces 45. These braces respectively have secured thereto respective belt straps 14a, which are looped over the frame bars 10 immediately thereabove, as shown at 14b, each strap being buckled at 45'. In this manner each side corner portion of the ski is strapped to the frame bar immediately above that corner portion.

Detachably clamped around the portions 23, 23 of each side brace 20 is a rectangular frame structure 50 comprising a pair of side bars 51, 51 connected together by transverse bolts 51' provided with wing nuts 53, as shown in Figure 3. Positioned on the bolts 51' between the respective side bars 51 are sleeve elements 52. The sleeve elements 52 are slightly shorter than the width of the brace portions 23, whereby the wing nuts 53 secure the frame 50 in tight clamping engagement about the portions 23, 23.

The sleeve element 52 at each end of the frame 50 carries an elongated brace rod 55 extending therefrom, and each of the rods is pivotally secured to one of four identical upright brackets 60 which are in turn secured in transverselyspaced pairs to the ski 40 adjacent opposite ends thereof.

When the ski attachment is to be removed from the carrier, the belts 14a are unfastened from the frame bars 10 and the clamping frames 50 are taken apart by removing the wing nuts 53, thereby allowing the sleeve elements 52 to be disengaged. Suitable U-shaped spring clips 55' are secured to the ski 40, spaced as shown in Figure 2, to clampingly receive the respective rod members 55 when the rod members are rotated downwardly to horizontal positions. By moving said rod members 55 into engagement with said spring clips 55', the ski attachment is folded to a very compact condition, facilitating the convenient transportation or storage thereof. The spring clips 55' are of sufficient vertical height so that the rod members 55 may be folded to horizontal positions with the rod members at each side of the ski overlapping, but still being clampingly received in their associated spring clips 55'.

While a specific embodiment of a ski attachment for a mono-wheel pack carrier has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A ski attachment for a mobile pack carrier including a frame, a pair of spaced suspension braces dependingly carried contiguous to the sides of said frame, and a supporting wheel positioned longitudinally of and between said suspension braces and rotatably supported therebetween, said attachment comprising a double-ended ski, a pair of longitudinally extending transversely disposed upstanding ears positioned intermediate the ends of said ski and secured therebetween for embracingly receiving and supporting said wheel therebetween, a frame engaged about each of said suspension braces and removably supported thereon, each of said frames comprising a pair of side bars arranged in spaced parallel relation with respect to each other and adapted for engagement with opposed faces of the adjacent one of said pairs of suspension braces, a nut-and-bolt assembly carried transversely of each end of said pair of side bars and operatively connected thereto for urging said side bars into clamping engagement with said suspension bars, a spacer element circumposed about the bolt of each of said assemblies intermediate said pair of side bars, and brace rods extending between the ends of said ski and the spacer element of the adjacent one of said frames and operatively connected therebetween.

2. A ski attachment for a mobile pack carrier including a frame, a pair of spaced suspension braces dependingly carried contiguous to the sides of said frame, and a supporting wheel positioned longitudinally of and between said suspension braces and rotatably supported therebetween, said attachment comprising a double-ended ski, a pair of longitudinally extending transversely disposed upstanding ears positioned intermediate the ends of said ski and secured therebetween for embracingly receiving and supporting said wheel therebetween, a frame engaged about each of said suspension braces and removably supported therein, each of said frames comprising a pair of side bars arranged in spaced parallel relation with respect to each other and adapted for engagement with opposed faces of the adjacent one of said pairs of suspension braces, a nut-and-bolt assembly carried transversely of each end of said pair of side bars and operatively connected thereto for urging said side bars into clamping engagement with said suspension bars, a spacer element circumposed about the bolt of each of said assemblies intermediate said pair of side bars, brace rods extending between the ends of said ski and the spacer element of the adjacent one of said frames and operatively connected therebetween, and strap means operatively connected between said frame and said ski for detachably securing the latter to said frame.

3. A ski attachment for a mobile pack carrier including a frame, a pair of spaced suspension braces dependingly carried contiguous to the sides of said frame, and a supporting wheel positioned longitudinally of and between said suspension braces and rotatably supported therebetween, said attachment comprising a double-ended ski, a pair of longitudinally extending transversely disposed upstanding ears positioned intermediate the ends of said ski and secured therebetween for embracingly receiving and supporting said reel therebetween, a frame engaged about each of said suspension braces and removably supported thereon, each of said frames comprising a pair of side bars arranged in spaced parallel relation with respect to each other and adapted for engagement with opposed faces of the adjacent one of said pairs of suspension braces, a nut-and-bolt assembly carried transversely of each end of said pair of side bars and operatively connected thereto for urging said side bars into clamping engagement with said suspension bars, a spacer element circumposed about the bolt of each of said assemblies intermediate said pair of side bars, and brace rods extending between the ends of said ski and the spacer element of the adjacent one of said frames and each having one end secured to the latter and having the other end pivotally carried by said ski, whereby, upon removal of each of said frames from the adjacent one of said pairs of suspension braces, each of said brace rods can be pivoted into a position overlying said ski for support thereon.

CASH E. GIOVANNONI.

REFERENCES CITED

The following references are of record in the file of this patent:

UNITED STATES PATENTS

| Number | Name | Date |
|---|---|---|
| 520,806 | Schofield | June 5, 1894 |
| 749,887 | Thiedemann | Jan. 19, 1904 |
| 2,261,751 | Brintnell | Nov. 4, 1941 |

FOREIGN PATENTS

| Number | Country | Date |
|---|---|---|
| 522,964 | France | Aug. 9, 1921 |